UNITED STATES PATENT OFFICE.

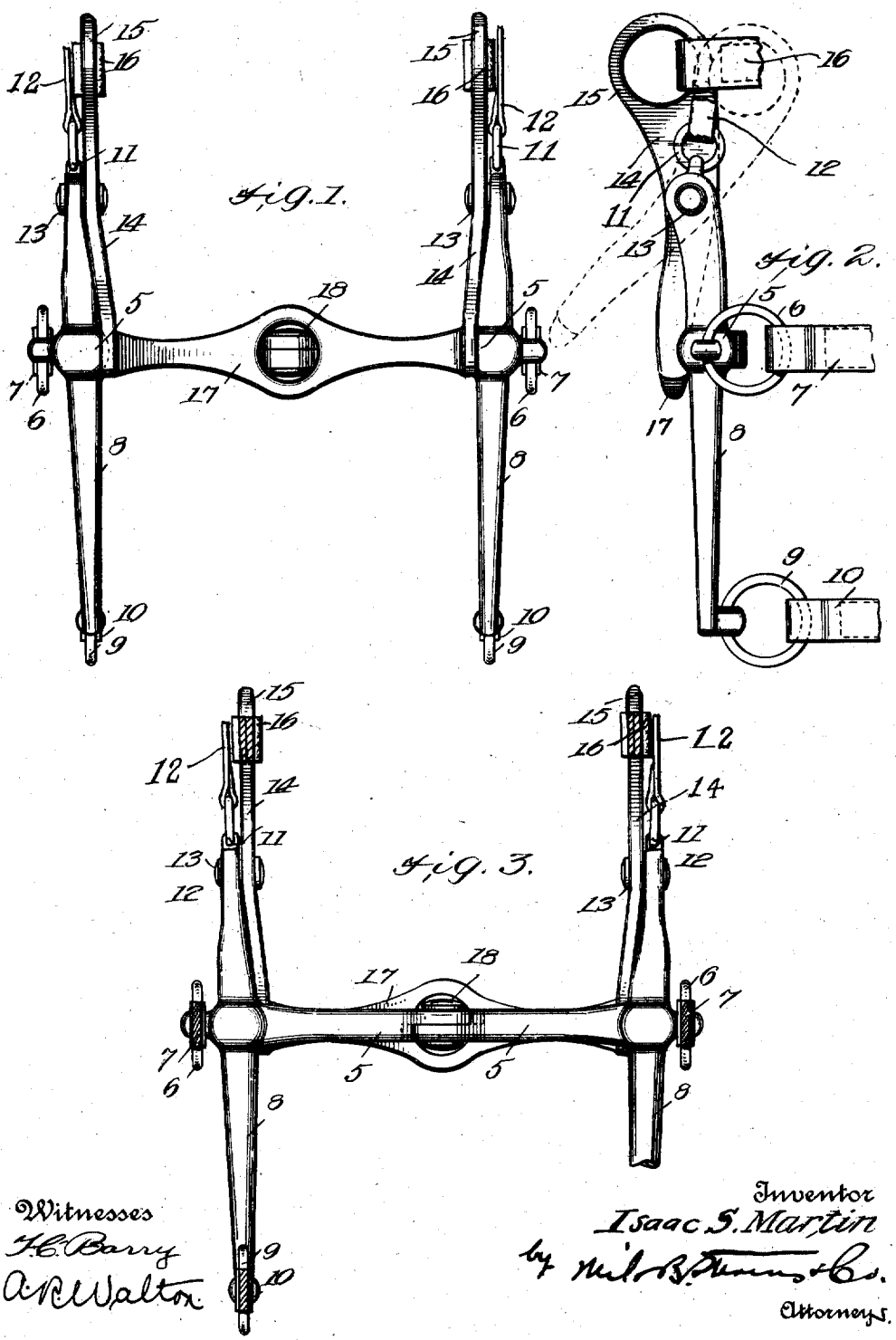

ISAAC S. MARTIN, OF FORT RILEY, KANSAS.

BRIDLE-BIT.

993,608. Specification of Letters Patent. Patented May 30, 1911.

Application filed December 14, 1910. Serial No. 597,269.

*To all whom it may concern:*

Be it known that I, ISAAC S. MARTIN, citizen of the United States, residing at Fort Riley, in the county of Geary and State of Kansas, have invented certain new and useful Improvements in Bridle-Bits, of which the following is a specification.

This invention relates to that class of bridle bits characterized by two bit bars which can be spread by a pull on the reins so as to press one of the bit bars against the roof of the animal's mouth.

The bit is designed for the purpose of obtaining better control of animals having strong mouths, and which are heavy on the hand; and it is adapted for all kinds of riding and driving.

In the accompanying drawing, forming a part of this specification, Figure 1 is a front elevation of a bit embodying the invention. Fig. 2 is a side elevation. Fig. 3 is a rear elevation.

Referring specifically to the drawing, 5 denotes the mouth-piece of a broken curb bit, provided at the outer ends with side rings 6 for attachment of the snaffle reins 7. The outer ends of the bit branches are also provided with cheek bars or lower branches 8 between which the former extend. The mouth-piece joins the cheek branches intermediate the ends of the latter. To the lower ends of the cheek branches are connected rings 9 for attachment of curb-reins 10, and to the upper ends of the cheek branches are connected rings 11 for attachment of the cheek straps 12 of the bridle. To the upper ends of the cheek bars 8 are pivoted, intermediate their ends, as indicated at 13, cheek branches 14, which latter have rings 15 at their upper ends for attachment of the curb-straps 16. The cheek branches 14 are connected at their lower ends by a light mouth-piece 17 which is enlarged midway between its ends and formed thereat with an opening 18. This mouth-piece lies normally in front of the curb bit mouth piece 5, and the lower ends of the branches 14 are shaped to lie closely against the inner surface of the upper portions of the branches 8.

The action of the bit is as follows: A pull on the reins 7 gives a snaffle effect, while a pull on the reins 10 gives a curb action, and also opens the jaws of the animal by causing the mouth-piece 17 to swing forwardly and press against the roof of the mouth, as shown by dotted lines in Fig. 2. When the jaws are opened by the action of the bit, the animal immediately opposes this, and upon releasing the pull, the jaws are closed at once. When desired, a simple snaffle effect only can be had by releasing all pressure except that on the snaffle reins 7.

The principle of the bit is one which will prevent the animal from stiffening the jaw, and thus will compel the same to be supple and pliable. The bit can be used for all kinds of riding and driving and it is especially intended for horses that have strong mouths and are heavy on the hand. The bit is smooth and light, and is not cruel, it operating merely to divert the animal from opposing the rider or driver. The bit operates as an ordinary snaffle, as well as a curb, and in connection with the curb action, the bit furnishes a means whereby the animal can be easily induced to alternately open and close the jaws so that the mouth is kept supple and pliable. The structure also protects the animal from putting the tongue over the bit, which, until corrected, renders impossible any degree of successful control of the animal. A horse addicted to this habit soon finds more comfort by keeping the tongue underneath where it properly forms a cushion to protect the mouth from the bit.

I claim:

1. A bridle bit comprising pivotally connected upper and lower cheek branches, mouth-pieces carried by said branches, the mouth-piece of the upper branches normally lying in front of the mouth-piece of the lower branches, and controlling means connected to said branches.

2. A bridle bit comprising pivotally connected upper and lower cheek branches, mouth-pieces carried by said branches, the mouth-piece of the lower branches having its ends connected to points on the lower branches which are intermediate the ends thereof, and the upper cheek branches being pivotally connected to the upper ends of the lower cheek branches, the mouth-piece of said upper cheek branches having its ends connected to points on the upper cheek branches which are at the lower ends thereof, means for connecting curb-reins to the lower ends of the lower cheek branches, attaching means for cheek straps at the upper ends of the last-mentioned cheek branches, and attaching means for curb straps at the upper ends of the upper cheek branches.

3. A bridle bit comprising pivotally connected upper and lower cheek branches, a snaffle-bit carried by the lower cheek branches and having attaching means for the snaffle reins, means for attaching curb reins to the lower ends of the lower cheek branches, attaching means for cheek straps at the upper ends of the last-mentioned cheek branches, a mouth-piece carried by the upper cheek branches at their lower ends, and means at the upper ends of the last-mentioned cheek branches for attachment of a curb strap.

In testimony whereof I affix my signature in presence of two witnesses.

ISAAC S. MARTIN.

Witnesses:
A. P. TROTT,
JOHN JANUED.

Copies of this patent may be obtained for five cents each, by addressing the "Commissioner of Patents, Washington, D. C."